Patented Mar. 21, 1944

2,344,688

UNITED STATES PATENT OFFICE 2,344,688

EMULSIFYING COMPOSITION

Cyril C. Folkrod, Chicago, Ill., assignor, by mesne assignments, to Valentine Laboratories, Inc., Chicago, Ill., a corporation of Illinois No Drawing. Application February 21, 1941, Serial No. 380,067

13 Claims. (Cl. 99—1)

This invention relates to emulsifiers and more particularly to the emulsifying compositions for effectively mixing oils with water, although it may be employed with equal advantage for other purposes.

It contemplates more especially the provision of improved emulsifiers or a composition of emulsifiers which result in the more efficient and less expensive emulsification of oils with water.

One object of the present invention is to provide an improved emulsifier for normally non-homogeneous substances.

Another object is to provide an improved methyl cellulose composition serving as an effective emulsifier for oil in water products.

Still another object is to provide an improved algin composition serving as an effective emulsifier for oil in water products.

A further object is to provide a novel methyl cellulose and algin derivative composition that serves as a highly efficient emulsifier.

A still further object is to provide a novel methyl cellulose and algin derivative composition that serves as a highly efficient emulsifier for oil in water mixtures intended for human consumption.

Still a further object is to provide a new emulsifying composition consisting of methyl cellulose and algin admixed to effectively emulsify oil in water compositions suitable for internal human consumption.

It has long been recognized that an emulsion of two or more respectively insoluble liquids having no affinity whatever for each other can be mechanically emulsified. Mechanical emulsions of such liquids that are not too far apart in their respective densities are more or less stable in that a coalescence gradually takes place. The stability of an emulsion is influenced by the difference in density between the two liquids, since the greater this difference, the greater difficulty is encountered in accomplishing stabilization.

The viscosity of the emulsifying liquid also plays an important part in the character of the resulting emulsion. The greater the viscosity of the dispersing medium, the weaker the intensity of the Brownian movement of the globules and this decreases the intensity of the shocks which this movement may produce among the different globules. Consequently, the tendency toward coalescence is reduced. The coalescence of the oil particles which brings about a break in the emulsion of two or more liquids of greatly differing densities, tends to occur much more readily as the surface tension of one in relation to the other such as the surface tension of the oil in relation to the water is greater.

It may be fairly concluded that the stability of an emulsion depends upon the surface tension that exists upon contact of the emulsified liquids. If a mixture of oil and water is emulsified, the subdivision of the oil and water into small drops or microscopic globules, more and more minute, brings about an increase of the surface of the minute particles against which the surface tension of the oil in relation to the water tends to oppose. Therefore, it is believed that an important factor of stability is to accomplish the greatest possible reduction of the surface tension of the two substances. The reduction of this surface tension is the purpose of introducing an emulsifier substance into the mixture.

The stability of an emulsion also depends considerably upon the molecular orientation of the stabilizer and the quality of its polar affinity therewith. The activity of orientation is so much more intense as these polar molecules attract different or opposite molecules situated at the ends of a longer chain to result in a new multipolar condensation product. In acccordance with the present teachings this new multipolar condensation product is formed from methyl cellulose and algin combined with oil and water wherein the oil is attracted to one active function of this new condensation product and the water to the active function of the opposite sign at the other end of the chain. It may well be that different emulsifiers or emulsifying compositions may act to develop or influence these different phenomena, but whatever may be their purpose, function, or result, such substances are called emulsifiers, stabilizers or plasticizers.

A great number of more or less complex products have been indicated as intended to fill the role of emulsifiers. Many of these products are soaps or compounds which can bring about the formation of soaps through a chemical reaction of the stabilizer upon the oil. Certain proteins such as gelatin, decithins; certain vegetable gums such as Arabic gum and tragacanth; certain vegetable colloids such as agar agar, Irish moss, and algin; certain synthetic colloids of phenolic origin or cellulosic derivatives such as methyl cellulose, could more or less act as powerful stabilizers. Individually, these do not possess all the required properties of a highly efficient emulsifier, stabilizer or plasticizer from a production as well as chemical standpoint.

Liquids such as mineral oil and water possessing large differentials in respective densities have for many years been emulsified in a more or less stable manner with gum tragacanth, agar agar, gum acacia, but these involve complications in production operations such as alternate mixing, storage during required standing for hours or even days, heating and cooling comprising exacting control operations which involve appreciable equipment such as colloidal mills, mixers, storage tanks, and pumps that are tied-up in processing for days to say nothing of entailing immense labor and time.

I have discovered that extraordinarily good emulsifiers result from the combination of certain synthetic cellulosic derivatives such as methyl cellulose ether with an alginous material which, according to certain ranges of mixture proportions, constitute a new and exceptional emulsifier for oil in water type emulsions involving mineral, vegetable, fish and animal oils, either fixed or volatile. Particularly favorable results have been accomplished by utilizing a commercially produced dimethyl cellulose ether and an alginous material prepared according to United States Letters Patent No. 2,128,551, although it should not be construed that other sources for the same class of substances are excluded. Not only has such emulsifying compositions given unusually excellent results, but emulsions of oil and water are effectively produced by direct mixing in a highly efficient mixer or preferably colloidal mills of standard construction without any requirement for heat, standing time, alternate cold and hot control operations nor entail any appreciable time.

By way of example rather than limitation, the following illustrate favorable cold emulsions produced in an efficient power mixer or preferably a colloidal mill of standard construction:

WHITE MINERAL OIL—SP. GR. RANGE 0.828 TO 0.905 AT 25° C.—KINEMATIC VISCOSITY RANGE NOT LESS THAN .381 TO NOT MORE THAN 0.370 AT 37.8° C.

50% MINERAL OIL EMULSIONS WITHOUT GLYCERINE

*Example 1*

| | Per cent |
|---|---|
| Mineral oil | 50 |
| Algin | .22 |
| Methyl cellulose 25 C. P. S | 1.10 |
| Water to total a 100% composition. | |

*Example 2*

| | Per cent |
|---|---|
| Mineral oil | 50 |
| Algin | .33 |
| Methyl cellulose 100 C. P. S | .275 |
| Water to total a 100% composition. | |

*Example 3*

Using any proportions of algin and methyl cellulose within the limits of the above alternative examples or varying proportions depending upon the grade of mineral oil and C. P. S. of methyl cellulose.

50% MINERAL OIL EMULSIONS WITH GLYCERINE

*Example 1*

| | | |
|---|---|---|
| Mineral oil U. S. P. XI | cc | 100 |
| Methyl cellulose 100 C. P. S | gram | 0.875 |
| Algin | do | 0.640 |
| Glycerine | cc | 6 |
| Distilled water | cc | 92.5 |

The algin and methyl cellulose are dissolved in the water, the glycerine added, followed by the mineral oil gradually added and emulsified with an efficient mixer. When emulsified in a colloidal mill, the ingredients are first mixed and then passed through the colloidal mill.

30% OIL EMULSIONS WITHOUT GLYCERINE

*Example 1*

| | Per cent |
|---|---|
| Mineral oil | 30 |
| Algin | 0.32 |
| Methyl cellulose 25 C. P. S | 1.60 |
| Water to total a 100% composition. | |

*Example 2*

| | Per cent |
|---|---|
| Mineral oil | 30 |
| Algin | 0.33 |
| Methyl cellulose 100 C. P. S | 0.275 |
| Water to total a 100% composition. | |

*Example 3*

| | Per cent |
|---|---|
| Mineral oil | 30 |
| Algin | 0.33 |
| Methyl cellulose 400 C. P. S | 0.275 |
| Water to total a 100% composition. | |

*Example 4*

Using any combination of these proportions and grades of methyl cellulose and algin within the limits of the above alternative examples or varying proportions depending upon the grade of mineral oil and C. P. S. of methyl cellulose.

30% OIL EMULSIONS WITH GLYCERINE

*Example 1*

| | | |
|---|---|---|
| Mineral oil U. S. P. IX | cc | 60 |
| Methyl cellulose 100 C. P. S | grams | 1.75 |
| Algin | do | 1.28 |
| Glycerine | cc | 6 |
| Distilled water | cc | 131 |

The algin and methyl cellulose are dissolved in the water, the glycerine added followed by the mineral oil gradually added and emulsified with an efficient mixer. When emulsified in a colloidal mill, the ingredients are fixed mixed and then passed through the colloidal mill.

Combinations of algin and methyl cellulose were found to be successful in emulsifying mineral oil U. S. P. XI in the following ratios:

From 1 part algin to 99 parts methyl cellulose to 1 part algin to 0.8 part methyl cellulose.

In general, as the proportion of methyl cellulose is reduced the higher viscosity grades are required.

Combinations of algin and methyl cellulose were found to be successful in emulsifying cod liver oil in the following ratios:

From 1 part algin to 99 parts methyl cellulose to 1 part algin to 2.5 parts methyl cellulose.

COD LIVER OIL EMULSIONS

*Example 1*

| | | |
|---|---|---|
| Cod liver oil | cc | 500 |
| Glycerine | cc | 60 |
| Algin | grams | 6.156 |
| Methyl cellulose 100 C. P. S | do | 4.664 |
| Distilled water | cc | 429.2 |

*Example 2*

| | | |
|---|---|---|
| Cod liver oil | cc | 300 |
| Glycerine | cc | 60 |
| Algin | grams | 8.208 |
| Methyl cellulose 100 C. P. S | do | 6.192 |
| Distilled water | cc | 625.6 |

These emulsions may be made without glycerine as in the case of mineral oil emulsions.

VEGETABLE OIL EMULSIONS

Example 1

| | | |
|---|---|---|
| Corn oil | cc | 100 |
| Methyl cellulose 1500 C. P. S. | grams | 2.25 |
| Algin | do | 0.1 |
| Distilled water | cc | 97.65 |

Example 2

| | | |
|---|---|---|
| Corn oil | cc | 66.6 |
| Algin | grams | 0.1666 |
| Methyl cellulose 1500 C. P. S. | do | 0.4166 |
| Calcium citrate | cc | 0.130 |
| Water | cc | 32.75 |

Example 3

| | | |
|---|---|---|
| Corn oil | cc | 60 |
| Methyl cellulose 100 C. P. S. | grams | 1.25 |
| Algin | do | 0.50 |
| Distilled water | cc | 38.25 |

VOLATILE OIL EMULSIONS SUCH AS OILS OF LEMON, ORANGE, LIME, PEPPERMINT, WINTERGREEN, SASSAFRAS AND THE LIKE

Example 1

| | | |
|---|---|---|
| Volatile oil | cc | 20 |
| Algin | grams | 0.9 |
| Methyl cellulose 100 C. P. S. | do | 2.25 |
| Distilled water | cc | 77 |

It should be appreciated that the proportions are not critical and may vary within a wide range depending upon the desired emulsion and the characteristics of the ingredients involved. However, it has been developed definitely that individually each one of these substances, namely methyl cellulose and algin result in only a temporary stabilization or emulsification when used singly in amounts that do not render the resulting product unpalatable from a human consumption standpoint. Methyl-cellulose has been successfully employed as a permanent emulsifier when used in appreciable quantities in excess of the ranges prescribed in the above illustrations, but it is not deemed advisable to resort to such large quantities in mineral emulsions requiring the resulting product to be palatable. When combined within a wide range of proportions, the resulting emulsifying composition produces a substantially permanent stabilization or emulsification of the various oils and water. The preferred emulsifying ingredients comprise dimethyl cellulose ether and algin of the type derived from seaweed in accordance with the process set forth in United States Letters Patent No. 2,128,551.

The alkyl cellulose and algin derivatives may be combined in their desired proportions in the form of a dry powder made available as a mixture ready for introduction in oil and water that is thoroughly intermixed and then broken down into finely divided globules in a colloidal mill of standard construction or other apparatus used for the same purpose. Then, too, the ingredient cost of the resulting product is materially reduced and the production operations rendered significantly simple compared to the more popularly used emulsifiers such as gum acacia, gum tragacanth, and agar agar heretofore thought indispensable for this same purpose.

There appears to be no direct chemical combination between the methyl cellulose derivative and algin, but rather a physical phenomenon of adsorption, the result of which is a true product by addition entailing a plurimolecular micella. Consequently, not only a product with polar molecules is obtained, but also a product with a long chain which enables the active terminal affinities to manifest themselves freely to gain a relative independence, and to orient speedily to the surface. The active acid polar group being in contact with water, and the hydroxyl group of the cellulosic ether orients to the surface of the globules of the insoluble substance. While theoretical explanations of the character or phenomena involved in producing the resulting product have been given, it should be understood that these do not necessarily follow and should not be construed as controlling. Wherever the term "edible oil" is used, it should be construed to include any oil that can be internally consumed without detriment to humans. Such substances like petroleum which is a mineral compound of paste consistency is also broadly covered by the term mineral or edible oil.

Various changes may be made in the embodiment of the invention herein specifically described without departing from the invention or sacrificing any of the features or advantages thereof, and nothing herein shall be construed as limitations upon the invention, its concept or structural embodiment as to the whole or any part thereof except as defined in the appended claims.

I claim:

1. An emulsifier for oil in water compositions comprising algin and methyl cellulose.

2. A product of manufacture comprising a methyl cellulose derivative and algin intermixed to comprise an emulsifier addition agent.

3. A product of manufacture comprising a dimethyl cellulose ether and algin intermixed to comprise an emulsifier addition agent for oil in water.

4. A product of manufacture comprising an aqueous methyl cellulose solution and algin intermixed to comprise an emulsifier addition agent for oil in water compositions.

5. A product of manufacture comprising a dimethyl cellulose ether and algin intermixed to comprise an emulsifier addition agent for oil in water compositions.

6. A composition containing an edible oil with water emulsified with aqueous solution of algin and methyl cellulose derivative.

7. A composition containing an edible oil with water emulsified with methyl cellulose and algin.

8. A composition containing an edible oil with water emulsified with dimethyl cellulose and algin.

9. A method of emulsifying an oil in water composition which consists in adding to an edible oil sufficient water to form the desired oil solution, then mechanically mixing the solution with an aqueous solution of methyl cellulose and algin to effect the substantially permanent stabilization thereof.

10. A method of emulsifying an oil in water composition which consists in adding to an edible oil sufficient water to form the desired oil solution, then mechanically mixing the solution with a dimethyl cellulose ether and algin to effect the substantially permanent stabilization thereof.

11. A method of emulsifying an oil in water composition which consists in adding to an edible oil sufficient water to form the desired oil solution, then mechanically mixing the solution with a dimethyl cellulose ether and algin to effect the substantially permanent stabilization thereof.

12. A method of emulsifying an oil in water composition which consists in adding to an edible oil sufficient water to form the desired oil solution, then mechanically mixing the solution with an emulsifier of the class consisting of an aqueous solution of methyl cellulose ether; and algin to effect the substantially permanent stabilization thereof.

13. A method of emulsifying an oil in water composition which consists in adding to an edible oil sufficient water to form the desired oil solution, then mechanically mixing the solution with an emulsifier of the class consisting of a premixed composition containing a methyl cellulose ether and algin to effect the substantially permanent stabilization thereof.

CYRIL C. FOLKROD.